(12) United States Patent
Shimizu et al.

(10) Patent No.: US 12,479,270 B2
(45) Date of Patent: Nov. 25, 2025

(54) HEAT MEDIUM TEMPERATURE ADJUSTMENT SYSTEM

(71) Applicant: SANDEN CORPORATION, Gunma (JP)

(72) Inventors: Nobutaka Shimizu, Gunma (JP); Osamu Takazawa, Gunma (JP); Ryo Miyakoshi, Gunma (JP); Wataru Iwazaki, Gunma (JP); Masaaki Sato, Gunma (JP)

(73) Assignee: SANDEN CORPORATION, Gunma (JP)

( * ) Notice: Subject to any disclaimer, the term of this patent is extended or adjusted under 35 U.S.C. 154(b) by 99 days.

(21) Appl. No.: 18/567,822

(22) PCT Filed: Jun. 23, 2022

(86) PCT No.: PCT/JP2022/025152
§ 371 (c)(1),
(2) Date: Dec. 7, 2023

(87) PCT Pub. No.: WO2022/270593
PCT Pub. Date: Dec. 29, 2022

(65) Prior Publication Data
US 2024/0270050 A1   Aug. 15, 2024

(30) Foreign Application Priority Data

Jun. 24, 2021   (JP) .................... 2021-105091

(51) Int. Cl.
*B60H 1/00* (2006.01)
(52) U.S. Cl.
CPC ..... *B60H 1/00978* (2013.01); *B60H 1/00914* (2013.01); *B60H 2001/00928* (2013.01);
(Continued)

(58) Field of Classification Search
CPC ............ B60H 1/00978; B60H 1/00914; B60H 2001/00928; B60H 2001/00935;
(Continued)

(56) References Cited

U.S. PATENT DOCUMENTS

2011/0197611 A1   8/2011   Hall
2018/0281562 A1*  10/2018   Spies .................... F25B 25/005

FOREIGN PATENT DOCUMENTS

JP   2012-505796 A   3/2012
JP   2016-097745 A   5/2016
(Continued)

OTHER PUBLICATIONS

Japanese Office Action dated Mar. 4, 2025 issued in corresponding Japanese Application No. 2021-105091; English translation; 8 pages.
(Continued)

*Primary Examiner* — Cassey D Bauer
(74) *Attorney, Agent, or Firm* — Rankin, Hill & Clark LLP

(57) ABSTRACT

A heat medium temperature adjustment system includes a heat medium circuit configured to circulate heat medium having a temperature controlled by a heat exchange with a heat source. The heat medium circuit includes a pump configured to pump the heat medium, and a plurality of heat exchangers for temperature-adjustment subjects configured to perform heat exchanges with temperature-adjustment subjects. The heat medium circuit is configured to form a series flow path to connect the pump to the plurality of heat exchangers for temperature-adjustment subjects when a system malfunction occurs.

11 Claims, 9 Drawing Sheets

(52) U.S. Cl.
CPC .............. *B60H 2001/00935* (2013.01); *B60H 2001/00942* (2013.01); *B60H 2001/00949* (2013.01)

(58) Field of Classification Search
CPC ........... B60H 2001/00942; B60H 2001/00949; B60H 1/00885
See application file for complete search history.

(56) References Cited

FOREIGN PATENT DOCUMENTS

| | | | |
|---|---|---|---|
| JP | 2016-199203 | A | 12/2016 |
| JP | 2017-044377 | A | 3/2017 |
| JP | 2018-080865 | A | 5/2018 |
| JP | 2019-043262 | A | 3/2019 |

OTHER PUBLICATIONS

International Search Report issued in PCT/JP2022/025152 dated Aug. 30, 2022.
Written Opinion issued in PCT/JP2022/025152 dated Aug. 30, 2022.

\* cited by examiner

| | Flow path switching device 100A of heat medium circuit 100 | | | | | | Auxiliary heat source 7 | Refrigerant circuit controller 1A of refrigerant circuit 1U | | | | | Remarks |
|---|---|---|---|---|---|---|---|---|---|---|---|---|---|
| | V1 | V2 | V3 | V4 | V5 | V6 | | ON-OFF valve 31V | ON-OFF valve 32V | Decompressor 14A | Decompressor 14B | Compressor 10 | |
| DEFAULT STATE | a | a | a | a | a | a | — | — | — | — | — | — | |
| ABNORMAL ACTION MODE 1 | a | a | a | a | a | a | NONUSE | CLOSED | CLOSED | ACTUATED | — | ACTUATED | Cooling during malfunction (operate refrigerant circuit) |
| ABNORMAL ACTION MODE 2 | a | a | a | a | a | a | USE | CLOSED | CLOSED | ACTUATED | ACTUATED | ACTUATED | Heating during malfunction (operate refrigerant circuit) |
| ABNORMAL ACTION MODE 3 | a | a | a | a | a | a | USE | CLOSED | CLOSED | — | — | BREAKDOWN | Heating during malfunction (compressor breakdown) |
| ABNORMAL ACTION MODE 4 | a | a | a | a | a | a | NONUSE | CLOSED | CLOSED | — | — | BREAKDOWN | Heat release from temperature-adjustment subject during malfunction (compressor breakdown) |
| OPERATION MODE 1 | a | a | b | a | a | a | NONUSE | CLOSED | CLOSED | ACTUATED | ACTUATED | ACTUATED | Cooling + battery cooling |
| OPERATION MODE 2 | a | a | b | b | a | a | NONUSE | CLOSED | CLOSED | ACTUATED | — | ACTUATED | Cooling |
| OPERATION MODE 3 | a | a | b | a | a | b | NONUSE | CLOSED | CLOSED | ACTUATED | ACTUATED | ACTUATED | Battery cooling |
| OPERATION MODE 4 | b | a | b | a | a | a | NONUSE | CLOSED | CLOSED | ACTUATED | ACTUATED | ACTUATED | Cooling and dehumidifying (temperature adjustment by heat release) |
| OPERATION MODE 5 | b | a | b | b | a | a | NONUSE | OPEN | CLOSED | ACTUATED | ACTUATED | ACTUATED | Heating and dehumidifying (temperature adjustment by heat absorption) |
| OPERATION MODE 6 | b | b | a | a | b | b | NONUSE | CLOSED | CLOSED | ACTUATED | ACTUATED | ACTUATED | Battery heating + heating (heat absorption from outdoor air) |
| OPERATION MODE 7 | b | b | a | a | b | b | NONUSE | OPEN | CLOSED | CLOSED | ACTUATED | ACTUATED | Accumulation of heat discharged from battery + heating (heat absorption from outdoor air) |
| OPERATION MODE 8 | b | b | b | a | a | b | NONUSE | OPEN | OPEN | ACTUATED | ACTUATED | ACTUATED | Heating (heat absorption from outdoor air and use of accumulated heat) |
| OPERATION MODE 9 | b | a | a | a | a | b | NONUSE | CLOSED | OPEN | ACTUATED | CLOSED | ACTUATED | Heating (use of accumulated heat) |
| OPERATION MODE 10 | b | a | a | a | a | b | NONUSE | CLOSED | CLOSED | ACTUATED | ACTUATED | ACTUATED | Heating and defrosting during stop of vehicle (use of accumulated heat) |
| OPERATION MODE 11 | b | a | b | a | a | b | NONUSE | CLOSED | CLOSED | ACTUATED | ACTUATED | ACTUATED | Heating and defrosting during stop of vehicle (use of accumulated heat) |
| OPERATION MODE 12 | b | b | a | a | b | a | USE | CLOSED | OPEN | ACTUATED | CLOSED | ACTUATED | Battery heating + heating (heat absorption from auxiliary heat source) |
| OPERATION MODE 13 | b | b | a | b | a | a | USE | OPEN | OPEN | ACTUATED | ACTUATED | ACTUATED | Heating (heat absorption from indoor air + heating (heat source) + use of discharged and accumulated heat) |

FIG. 9

HEAT MEDIUM TEMPERATURE ADJUSTMENT SYSTEM

TECHNICAL FIELD

The present invention relates to a heat medium temperature adjustment system including a heat medium circuit.

BACKGROUND ART

A temperature adjustment system includes a heat medium circuit (for example, a water circuit) separated into individual heat medium circuits corresponding to controlled temperatures of temperature-adjusted subjects. In the heat medium circuit, heat mediums having predetermined temperatures adjusted by heat exchanges with a heat source such as a heat pump are circulated. In this case, the heat medium circuit includes selector valves to connect the individual heat medium circuits in series to adjust the temperatures of the heat mediums circulating therethrough (see Patent Literature 1 below).

CITATION LIST

Patent Literature

PTL1: Japanese translation of PCT application No. 2012-505796

SUMMARY OF INVENTION

Problem to be Solved by the Invention

In the above-described temperature adjustment system including the heat medium circuit, when a system malfunction such as a breakdown of the above-described selector valve or heat source such as the heat pump occurs, the heat mediums circulating through the heat medium circuit flows through individual flow paths while their temperatures cannot be controlled. This causes a problem that the temperatures of some of the temperature-adjusted subjects cannot be controlled by the heat mediums.

To solve the above-described problem, it is therefore an object of the invention to provide a heat medium temperature adjustment system capable of adjusting the temperatures of a lot of temperature-adjustment subjects by circulating the heat mediums having the controlled temperatures, even when a system malfunction occurs.

Solution to Problem

To achieve the object, a heat medium temperature adjustment system according to the invention includes a heat medium circuit configured to circulate heat medium having a temperature controlled by a heat exchange with a heat source. The heat medium circuit includes a pump configured to pump the heat medium, and a plurality of heat exchangers for temperature-adjustment subjects configured to perform heat exchanges with temperature-adjustment subjects. The heat medium circuit is configured to form a series flow path to connect the pump to the plurality of heat exchangers for temperature-adjustment subjects when a system malfunction occurs.

Effect of the Invention

In the heat medium temperature adjustment system having the above-described features, a series flow path is formed to connect pumps to a plurality of heat exchangers for temperature-adjustment subjects, and therefore it is possible to adjust the temperatures of a lot of temperature-adjustment subjects connected to the series flow path even when a system malfunction occurs.

BRIEF DESCRIPTION OF DRAWINGS

(FIG. 3A illustrates the default state; and FIG. 3B illustrates a non-default state);

(FIG. 4A illustrates the default state; and FIG. 4B illustrates the non-default state);

FIGS. 7B and 7C illustrate decompression in one step);

(FIG. 8A illustrates an example of shutting the upstream side of a heater core; and FIG. 8B illustrates an example of shutting an air flow path only through a cooler core); and FIG. 9 is a table listing abnormal action modes and operation modes of the heat medium temperature adjustment system.

DESCRIPTION OF EMBODIMENTS

Hereinafter, an embodiment of the invention will be described in detail with reference to the drawings. In the description below, the same reference number in different drawings denotes the same component with the same function, and duplicate description for each of the drawings is omitted accordingly.

Figure 1:
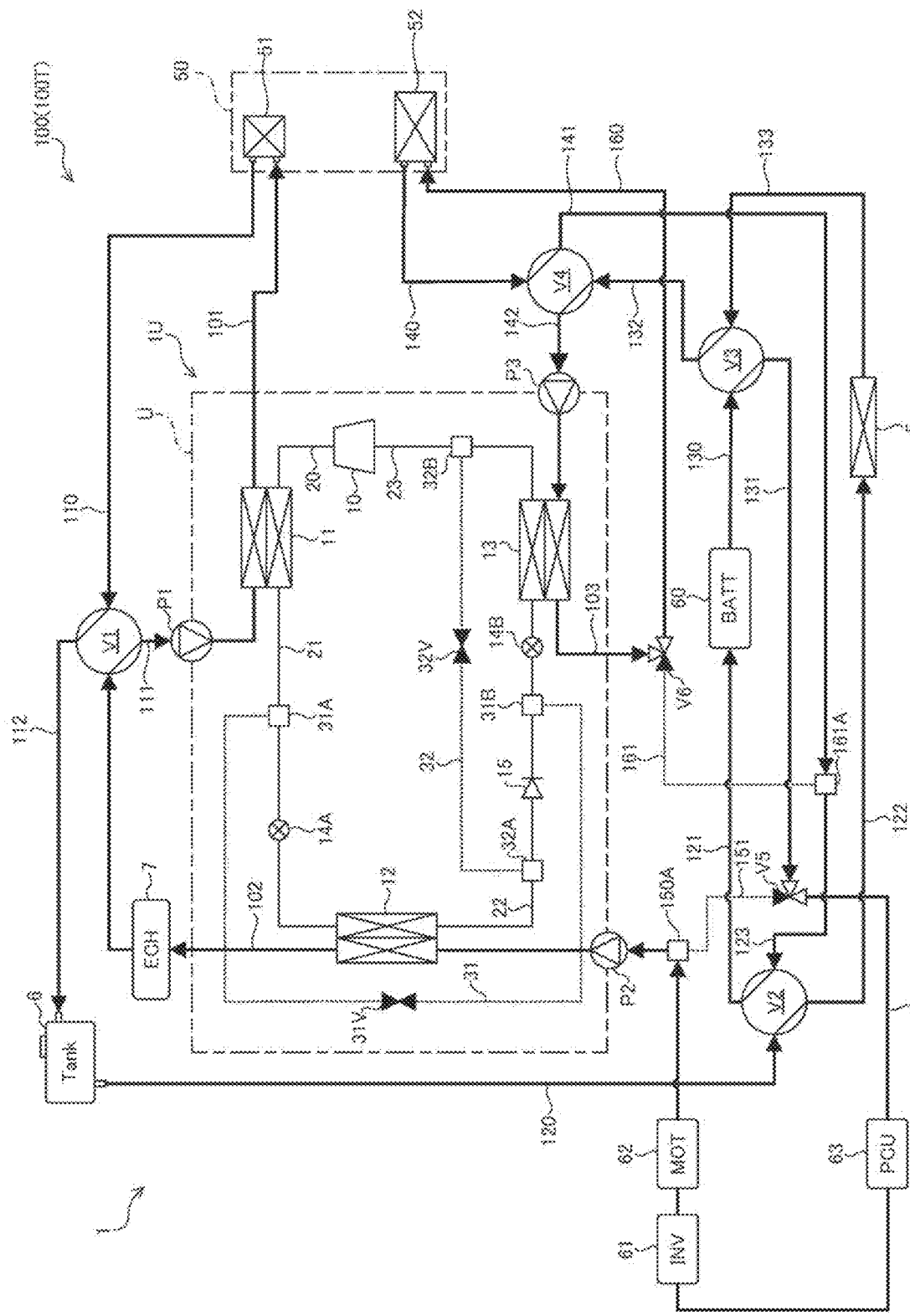
FIG. 1 illustrates an example of the configuration of a heat medium temperature adjustment system according to an embodiment of the invention (selector valves V1 to V4 are in a default state)

In FIG. 1, a heat medium temperature adjustment system 1 according to an embodiment of the invention includes a heat medium circuit 100. An example of the heat medium temperature adjustment system 1 is a vehicle heat management system for an EV (electric vehicle).

The heat medium circuit 100 is configured to circulate heat mediums having temperatures controlled by heat exchanges with a refrigerant circuit 1U as a heat source, and includes pumps P1, P2 and P3 to pump the heat mediums, and a plurality of heat exchangers for temperature-adjustment subjects. With the illustrated example, the plurality of heat exchangers for temperature-adjustment subjects include a heater core 51 and a cooler core 52 of an indoor air conditioner 50, and heat exchangers for temperature-adjustment subject parts 60, 61, 62, and 63 configured to adjust the temperatures of temperature-adjustment subject parts such as a battery, an inverter, a motor, and a power control unit.

Figure 2:
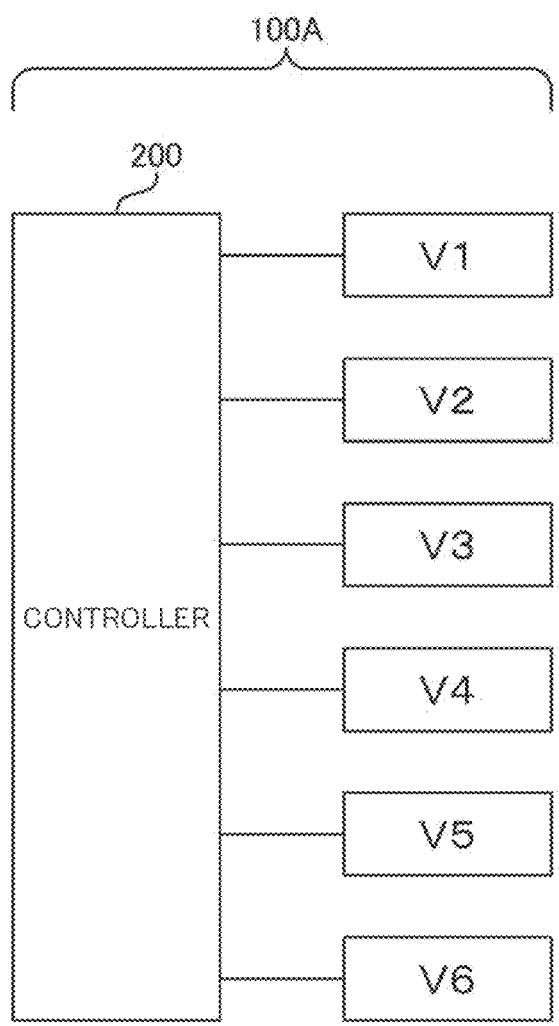
FIG. 2 illustrates a flow path switching device of a heat medium circuit.

In addition, the heat medium circuit 100 includes selector valves V1, V2, V3, V4, V5, and V6. These selector valves V1 to V6, and a controller 200 configured to control the switching of the selector valves V1 to V6 constitute a flow path switching device 100A as illustrated in FIG. 2.

Figure 3A:
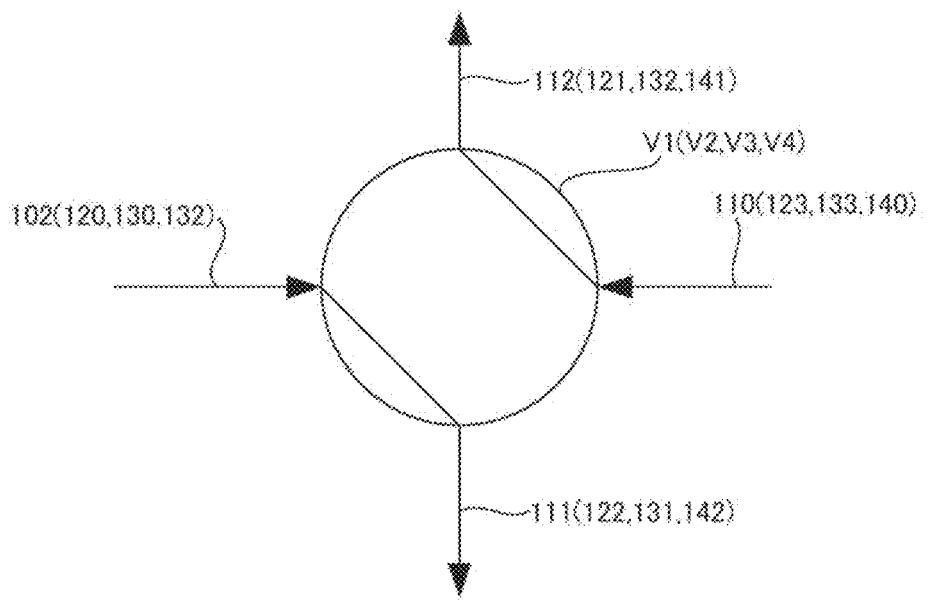
FIGS. 3A and 3B illustrate switching states of the selector valves V1 to V4.
Figure 3B:
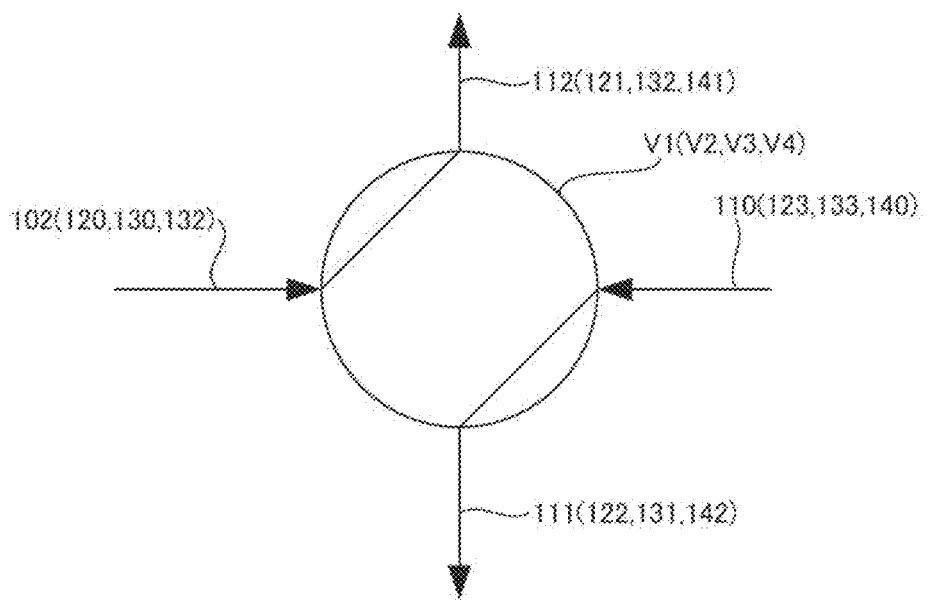
Figure 4A:
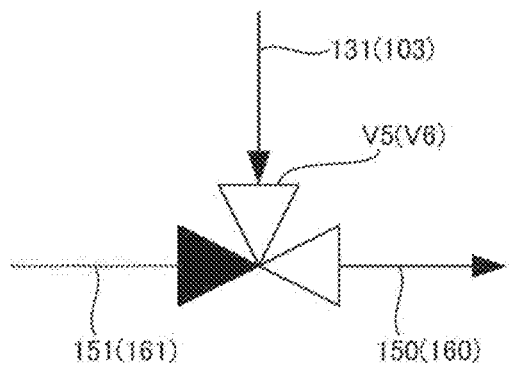
FIGS. 4A and 4B illustrate switching states of selector valves V5 and V6.
Figure 4B:
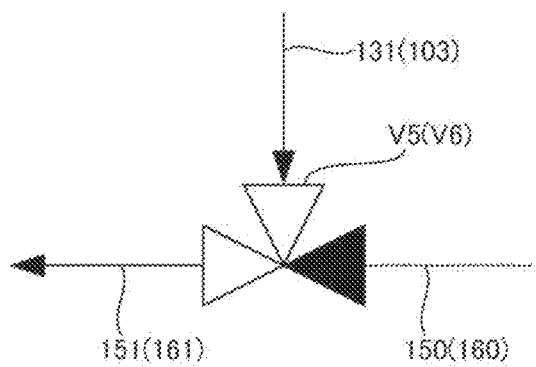

The flow path switching device 100A switches the selector valves V1 to V6 between the default state illustrated in FIG. 3A and FIG. 4A and the non-default state illustrated in FIG. 3B and FIG. 4B. Here, the default state is a state to return to the initial state when a system malfunction occurs. The default state includes, for example, the non-energization state of the flow path switching device 100A.

In FIG. 1, flow paths through which the heat mediums flow are indicated by bold lines, and flow directions are indicated by arrows in the heat medium circuit 100 when the flow path switching device 100A is in the default state.

Here, in the default state, the selector valve V1 allows the heat medium entering from a flow path 110 to flow to a flow path 112, and allows the heat medium entering from a flow path 102 to flow to a flow path 111. Meanwhile, in the non-default state, the selector valve V1 allows the heat medium entering from the flow path 110 to flow to the flow path 111, and allows the heat medium entering from the flow path 102 to flow to the flow path 112.

In the default state, the selector valve V2 allows the heat medium entering from a flow path 120 to flow to a flow path 122, and allows the heat medium entering from a flow path 123 to flow to a flow path 121. Meanwhile, in the non-default state, the selector valve V2 allows the heat medium entering from the flow path 120 to flow to the flow path 121, and allows the heat medium entering from the flow path 123 to flow to the flow path 122.

In the default state, the selector valve V3 allows the heat medium entering from a flow path 130 to flow to a flow path 131, and allows the heat medium entering from a flow path 133 to flow to a flow path 132. Meanwhile, in the non-default state, the selector valve V3 allows the heat medium entering from the flow path 130 to flow to the flow path 132, and allows the heat medium entering from the flow path 133 to flow to the flow path 131.

In the default state, the selector valve V4 allows the heat medium entering from the flow path 132 to flow to a flow path 142, and allows the heat medium entering from a flow path 140 to flow to a flow path 141. Meanwhile, in the non-default state, the selector valve V4 allows the heat medium entering from the flow path 132 to flow to the flow path 141, and allows the heat medium entering from the flow path 140 to flow to the flow path 142.

In the default state, the selector valve V5 allows the heat medium entering from the flow path 131 to flow to a flow path 150. Meanwhile, in the non-default state, the selector valve V5 allows the heat medium entering from the flow path 131 to flow to a joining point 150A via a flow path 151 without flowing through the flow path 150. In the default state, the selector valve V6 allows the heat medium entering from a flow path 103 to flow to a flow path 160. Meanwhile, in the non-default state, the selector valve V6 allows the heat medium entering from the flow path 103 to flow to a joining 161A via a flow path 161 without flowing through the flow path 160.

In the default state of the flow path switching device 100A, the heat medium circuit 100 is configured to form a series flow path 100T to connect the pumps P1, P2, and P3 to the plurality of heat exchangers for temperature-adjustment subjects (the heater core 51, the cooler core 52, and the heat exchangers for temperature-adjustment subject parts 60, 61, 62 and 63). That is, the heat medium circulating through the series flow path 100T of the heat medium circuit 100 passes through all of the plurality of pumps P1, P2, and P3, and the plurality of heat exchangers for temperature-adjustment subjects (the heater core 51, the cooler core 52, and the heat exchangers for temperature-adjustment subject parts 60, 61, 62, and 63).

In the series flow path 100T illustrated in FIG. 1, the heat medium having exiting from the pump P1 passes through a flow path 101 running through a refrigerant-heat medium heat exchanger 11 in the refrigerant circuit 1U, enters the heater core 51, exits from the heater core 51, passes through the flow path 110, and enters the selector valve V1. The heat medium having exited from the selector valve V1 passes through the flow path 112, enters a tank 6, exits the tank 6, passes through the flow path 120, and enters the selector valve V2.

The heat medium having exited from the selector valve V2 passes through the flow path 122, enters an outdoor heat exchanger 5 configured to perform a heat exchange with the outdoor air, exits the outdoor heat exchanger 5, passes through the flow path 133, and enters the selector valve V3. The heat medium having exited from the selector valve V3 passes through the flow path 132, enters the selector valve V4, exits from the selector valve V4, passes through the flow path 142, and enters the pump P3.

The heat medium having exited from the pump P3 passes through the flow path 103 running through a refrigerant-heat medium heat exchanger 13 in the refrigerant circuit 1U, enters the selector valve V6, exits from the selector valve V6, passes through the flow path 160, enters the cooler core 52, exits from the cooler core 52, passes through the flow path 140, and enters the selector valve V4.

The heat medium having exited from the selector valve V4 passes through the flow path 141, the joining point 161A, and the flow path 123, enters the selector valve V2, exits from the selector valve V2, passes through the flow path 121, the heat exchanger for temperature-adjustment subject part 60 for the battery, and the flow path 130, and enters the selector valve V3. The selector valve V3 having exited from the selector valve V3 passes through the flow path 131, and enters the selector valve V5. The heat medium having exited from the selector valve V5 passes through the flow path 150 running through the heat exchangers for temperature-adjustment subject parts 63, 61, and 62, passes through the joining point 150A, and enters the pump P2.

The heat medium having exited from the pump P2 passes through the flow path 102 running through a refrigerant-heat medium heat exchanger 12 in the refrigerant circuit 1U, and enters the selector valve V1. The heat medium having exited from the selector valve V1 passes through the flow path 111, and returns to the pump P1. An auxiliary heat source 7 configured to heat the heat medium is provided in the flow path 102 as needed.

Figure 5:
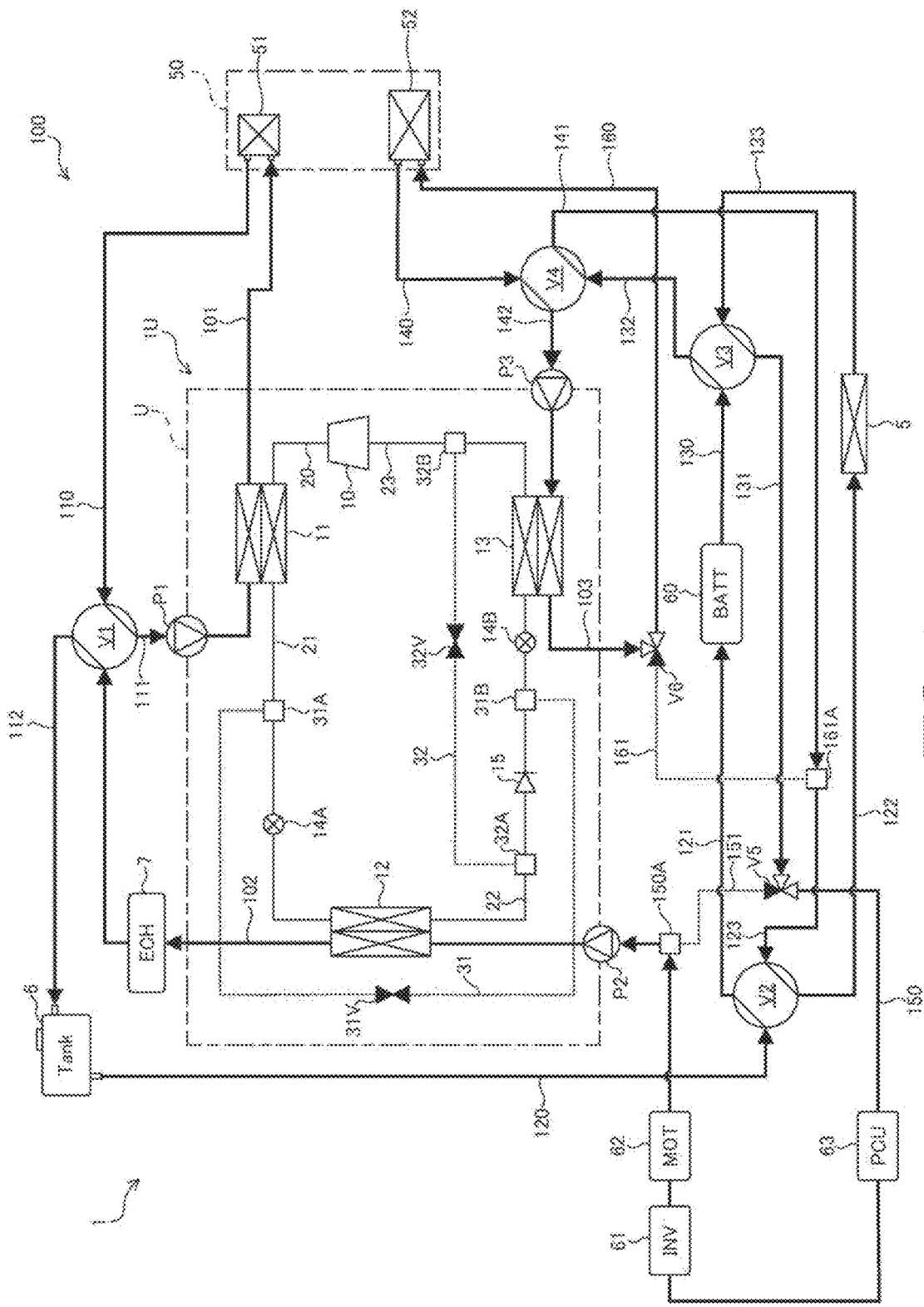
FIG. 5 illustrates an example of the configuration of the heat medium temperature adjustment system according to an embodiment of the invention (the selector valves V1 to V4 are in the non-default state)

In contrast, when the selector valves V1 to V4 of the flow path switching device 100A are switched to the non-default state, a plurality of individual circuits are formed for each of the pumps P1, P2 and P3, one of the pumps P1, P2, and P3 is provided in each of the individual circuits, and one of the heat exchangers for temperature-adjustment subjects is provided in each of the individual circuit in the heat medium circuit 100 as illustrated in FIG. 5.

In FIG. 5, the heat medium having exited from the pump P1 passes through the flow path 101 running through the refrigerant-heat medium heat exchanger 11 of the refrigerant circuit 1U, passes through the heater core 51, the flow path 110, the selector valve V1, the flow path 111, and returns to the pump P1 to form a first individual circuit.

In addition, the heat medium having exited from the pump P2 passes through the flow path 102 running through the refrigerant-heat medium heat exchanger 12 of the refrigerant circuit 1U, passes through the selector valve V1, the flow path 112, the tank 6, the flow path 120, the selector valve V2, the flow path 121, the heat exchanger for temperature-adjustment subject part 60, the flow path 130, the selector valve V3, the flow path 132, the selector valve V4, the flow path 141, the joining point 161A, the flow path 123, the selector valve V2, the flow path 122, the outdoor heat exchanger 5, the flow path 133, the selector valve V3, the flow path 131, the selector valve V5, the flow path 150 (the heat exchangers for temperature-adjustment subject parts 63, 61, and 62), and the joining point 150A, and returns to the pump P2 to form a second individual circuit.

Moreover, the heat medium having exited from the pump P3 passes through the flow path 103 running through the refrigerant-heat medium heat exchanger 13 of the refrigerant circuit 1U, passes through the selector valve V6, the flow path 160, the cooler core 52, the flow path 140, the selector valve V4, and the flow path 142, and returns to the pump P3 to form a third individual circuit.

The refrigerant circuit 1U illustrated in FIG. 1 will be described. The refrigerant circuit 1U includes a compressor 10 configured to compress refrigerant, and a refrigerant circulating flow path configured to condense, expand and evaporate the refrigerant having exited from the compressor 10 and to return the refrigerant to the compressor 10.

In the refrigerant circuit 1U, the refrigerant-heat medium heat exchanger 11 provided downstream of the compressor 10, the refrigerant-heat medium heat exchanger 12 provided downstream of the refrigerant-heat medium heat exchanger 11, and the refrigerant-heat medium heat exchanger 13 provided upstream of the compressor 10 are heat exchangers configured to perform heat exchanges between the refrigerant and the heat medium flowing through the heat medium circuit 100. At least one refrigerant-heat medium heat exchanger is provided in each of the above-described individual circuits of heat medium circuit 100.

The refrigerant circuit 1U includes three heat exchangers (the refrigerant-heat medium heat exchanges 11, 12 and 13) in the illustrated example, but may include four or more heat exchangers as needed. Two or more of at least three heat exchangers of the refrigerant circuit 1U are selected, and one of the selected heat exchangers functions as a condenser, and the other functions as an evaporator.

With the example illustrated in FIG. 1, on-off valves 31V and 32V are opened and closed to selectively open and close bypass refrigerant flow paths 31 and 32, and therefore to select the above-described heat exchangers. The heat exchanger provided downstream of the compressor 10 and near the compressor 10 functions as a condenser, and the heat exchanger provided downstream of the compressor 10 and far from the compressor 10 functions as an evaporator.

In FIG. 1, the refrigerant circuit 1U includes: a refrigerant flow path 20 connected to the outlet of the compressor 10 at one end and connected to the inlet of the first refrigerant-heat medium heat exchanger 11 at the other end; a refrigerant flow path 21 connected to the outlet of the refrigerant-heat medium heat exchanger 11 at one end and connected to the inlet of the second refrigerant-heat medium heat exchanger 12 at the other end; a refrigerant flow path 22 connected to the outlet of the refrigerant-heat medium heat exchanger 12 at one end and connected to the inlet of the refrigerant-heat medium heat exchanger 13 at the other end; and a refrigerant flow path 23 connected to the outlet of the refrigerant-heat medium heat exchanger at one end and connected to the inlet of the compressor 10 at the other end.

In addition, the refrigerant circuit 1U includes decompressors 14A and 14B. The decompressors 14A and 14B are configured to decompress the refrigerant having a high pressure compressed by the compressor 10 to a predetermined pressure. With the example illustrated in FIG. 1, the decompressor 14A is provided in the refrigerant flow path 21 between the refrigerant-heat medium heat exchanger 11 and the refrigerant-heat medium heat exchanger 12, and the decompressor 14B is provided in the refrigerant flow path 22 between the refrigerant-heat medium heat exchanger 12 and the refrigerant-heat medium heat exchanger 13. The decompressor 14A and the decompressor 14B can be adjusted individually to reduce the pressure of the compressed refrigerant to the predetermined pressure by optionally adjusting the degree of opening from the fully open state to the fully closed state.

In the refrigerant circuit 1U illustrated in FIG. 1, the bypass refrigerant flow paths 31 and 32 are provided to be able to selectively bypass one of the refrigerant-heat medium heat exchanger 12 and the refrigerant-heat medium heat exchanger 13. With the illustrated example, the bypass refrigerant flow path 31 allows the refrigerant-heat medium heat exchanger 12 to be bypassed, and the bypass refrigerant flow path 32 allows the refrigerant-heat medium heat exchanger 13 to be bypassed.

The bypass refrigerant flow path 31 includes a branching point 31A provided in the refrigerant flow path 21 and a joining point 31B provided in the refrigerant flow path 22. The branching point 31A is provided upstream of the decompressor 14A, and the joining point 31B is provided upstream of the decompressor 14B.

The bypass refrigerant flow path 32 includes a branching point 32A provided in the refrigerant flow path 22 and a joining point 32B provided in the refrigerant flow path 23. The branching point 32A is provided upstream of the joining point 31B of the bypass refrigerant flow path 31. By this means, the joining point 31B of the bypass refrigerant flow path 31 is provided between the branching point 32A of the bypass refrigerant flow path 32 and the refrigerant-heat medium heat exchanger 13.

In addition, the branching point 32A of the bypass refrigerant flow path 32 is provided upstream of the decompressor 14B and the joining point 31B of the bypass refrigerant flow path 31. A backflow preventer (for example, a check valve) 15 is provided between the branching point 32A of the bypass refrigerant flow path 32 and the joining point 31B of the bypass refrigerant flow path 31.

Figure 6:
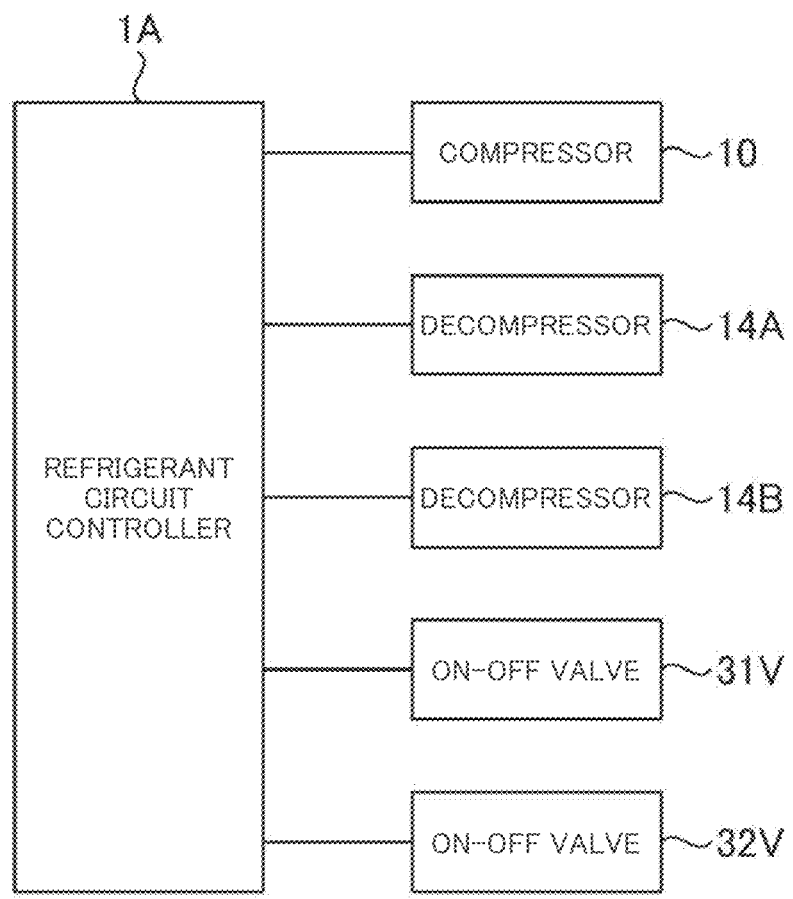
FIG. 6 illustrates a refrigerant circuit controller.

The refrigerant circuit 1U, as the heat source for the heat medium circuit 100, can generate the heat mediums having various temperature ranges by a refrigerant circuit controller 1A configured to control the compressor 10, the decompressors 14A and 14B, and the on-off valves 32V and 32V as illustrated in FIG. 6. In addition, by combining with the switching of the above-described flow path switching device 100A of the heat medium circuit 100, it is possible to perform various operation modes and abnormal action modes described later. Moreover, the refrigerant circulating flow path including the bypass refrigerant flow paths 31 and 32 of the refrigerant circuit 1U can be accommodated in a unit U indicated by a dashed line as illustrated. By this means, it is possible to unitize and compact the refrigerant circuit 1U.

When a system malfunction occurs in the heat medium temperature adjustment system 1, the flow path switching device 100A becomes in the default state, and therefore the heat medium circuit 100 forms the series flow path 100T as illustrated in FIG. 1. By forming the series flow path 100T, for example, when one of the pumps P1, P2 and P3 has any trouble, it is possible to circulate the heat medium having the controlled temperature through the series flow path 100T as long as one of the pump P1, P2 and P3 is actuated, and possible to appropriately adjust the temperatures of the temperature-adjustment subject parts connected in series through the series flow path 100T.

Figure 7A:
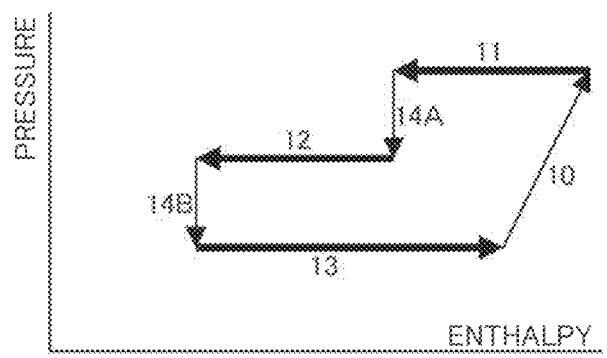
FIGS. 7A-7D illustrate action modes of a refrigerant circuit when an abnormal action occurs (FIGS. 7A and 7D illustrate decompression in two steps.
Figure 7B:
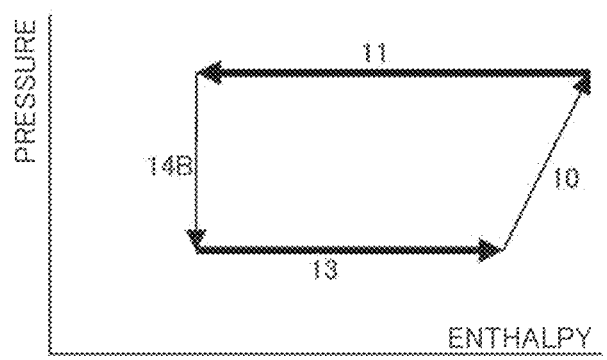
Figure 7C:
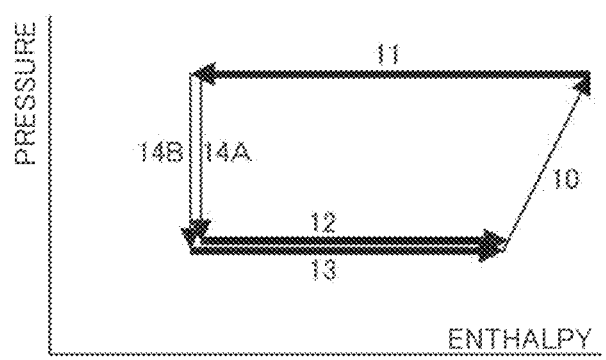
Figure 7D:
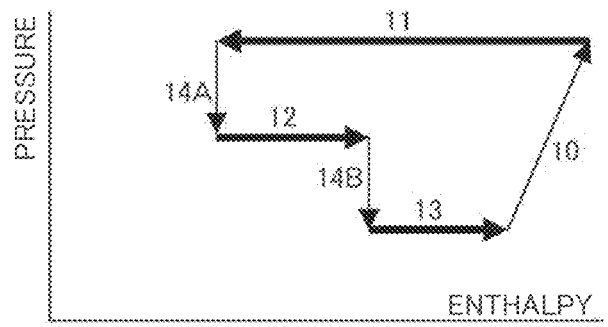
Figure 8A:
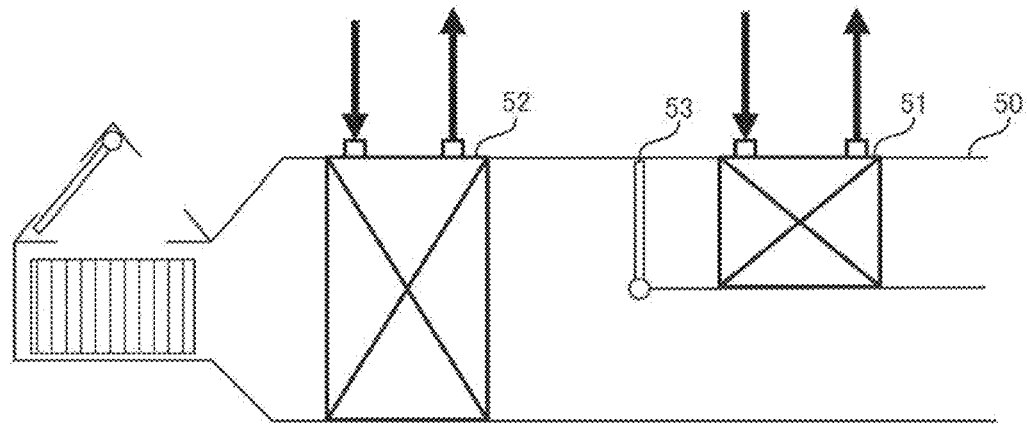
FIGS. 8A and 8B illustrate the state of an air mix door of an indoor air conditioner when an abnormal action occurs.
Figure 8B:
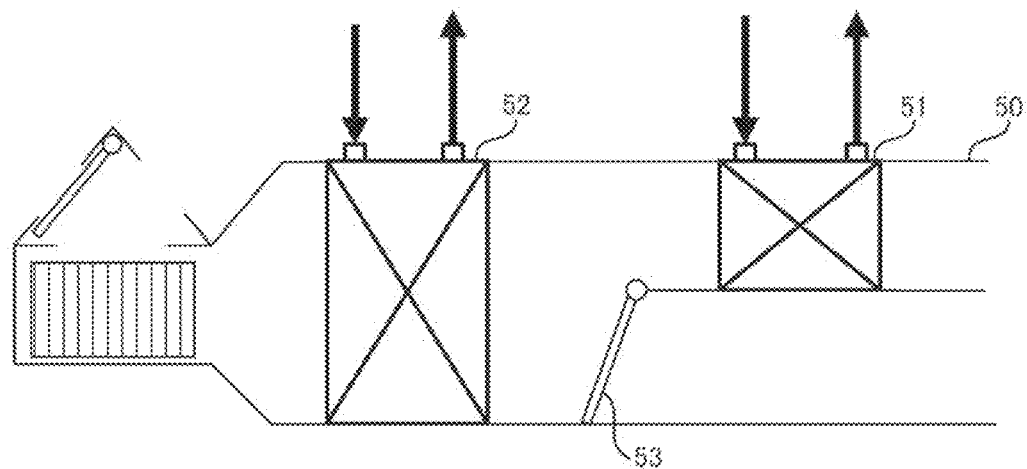

In a case where a system malfunction occurs, and therefore the flow path switching device 100A becomes in the default state, when the refrigerant circuit 1U is operated, the refrigerant circuit controller 1A controls to select among action modes illustrated in FIGS. 7A to 7D, and the indoor air conditioner 50 switches the air flow path between the states as illustrated in FIGS. 8A and 8B. By this means, it is possible to perform the cooling operation (abnormal action mode 1) and the heating operation (abnormal action mode 2).

In the case of the cooling operation (abnormal action mode 1), the action modes illustrated in FIGS. 7A, 7B, and 7C are performed in the refrigerant circuit 1U, and the indoor air conditioner 50 shuts an air flow path that allows the air to flow through the heater core 51 as illustrated in FIG. 8A.

In the action mode illustrated in FIG. 7A, the on-off valves 31V and 32V are closed as illustrated in FIG. 1, and the refrigerant-heat medium heat exchanger 11 and the refrigerant-heat medium heat exchanger 12 function as condensers, and the refrigerant-heat medium heat exchanger 13 functions as an evaporator. In this case, when decompression is performed by the decompressor 14A and 14B in two steps as illustrated, the heat is released in the refrigerant-heat medium heat exchanger 11 and the refrigerant-heat medium heat exchanger 12 step by step. However, the decompressor 14A may be fully opened, and the heat may be released in the refrigerant-heat medium heat exchanger 11 and the refrigerant-heat medium heat exchanger 12, and decompression may be performed by the decompressor 14B in one step, and the refrigerant-heat medium heat exchanger 13 may function as an evaporator.

In the action mode illustrated in FIG. 7B, the on-off valve 31V is opened and the on-off valve 32V is closed, the refrigerant flows to the bypass refrigerant flow path 31 bypassing the refrigerant-heat medium heat exchanger 12, the refrigerant-heat medium heat exchanger 11 functions as a condenser, and the refrigerant-heat medium heat exchanger 13 functions as an evaporator. In this case, decompression is performed by the decompressor 14B in one step.

In the action mode illustrated in FIG. 7(c), the on-off valves 31V and 32V are opened, the refrigerant flows to the bypass refrigerant flow paths 31 and 32 to allow the refrigerant to flow through the refrigerant-heat medium heat exchangers 12 and 13 in parallel, the refrigerant-heat medium heat exchanger 11 functions as a condenser, and the refrigerant-heat medium heat exchangers 12 and 13 function as evaporators in parallel. In this case, the decompression is performed by the decompressors 14A and 14B in one step.

Then, the series flow path 100T of the heat medium circuit 100 allows the heat medium to flow through the outdoor heat exchanger 5 configured to perform a heat exchange between the heat medium and the outdoor air, the refrigerant-heat medium heat exchanger 13 functioning as an evaporator, the cooler core 52, and the heat exchangers for temperature-adjustment subject parts 60, 63, 61, and 62 in this order.

By this means, the heat medium having passed through the refrigerant-heat medium heat exchanger 11 or 12 on the heat release side and been heated releases the heat to the outside in the outdoor heat exchanger 5, and then enters the refrigerant-heat medium heat exchanger 11. Then, the heat of the heat medium is absorbed in the refrigerant-heat medium heat exchanger 13 functioning as an evaporator, and the heat medium having a low temperature passes through the flow path 103, the selector valve V6, and the flow path 160, is delivered to the cooler core 52, and is subjected to a heat exchange with the indoor air in the indoor air conditioner 50 to cool the air.

The heat medium having exited from the cooler core 52 flows through the flow path 140, the selector valve V4, the flow path 141, the joining point 161A, the flow path 123, the selector valve V2, the flow path 121, the heat exchanger for temperature-adjustment subject part 60, the flow path 130, the selector valve V3, the flow path 131, the selector valve V5, and the flow path 150 running through the heat exchangers for temperature-adjustment subject parts 63, 61, and 62 to cool (adjust the temperatures of) the temperature-adjustment subject parts such as the battery, the power control unit, the inverter, and the motor.

In this case, the heat medium flows through the flow path 102 and flow path 101, and therefore is heated by the heat released in the refrigerant-heat medium heat exchanger 12 and the refrigerant-heat medium heat exchanger 11 functioning as condensers, and is delivered to the heater core 51. Here, an air mix door 53 provided upstream of the air flow path of the heater core 51 is closed in the indoor air conditioner 50 as illustrated in FIG. 8A. By this means, it is possible to prevent the air from being heated by the heater core 51 during the cooling. In addition, by adjusting the degree of opening of the air mix door 53, it is possible to adjust the temperature of the cooling. The heat medium having exited from the heater core 51 releases the heat in the outdoor heat exchanger 5, and then is delivered to the refrigerant-heat medium heat exchanger 13 as an evaporator as described above.

On the other hand, in the heating operation (abnormal action mode 2), the action modes illustrated in FIGS. 7B, 7C, and 7D are performed in the refrigerant circuit 1U, and the indoor air conditioner 50 shuts an air flow path that allows the air to flow into the vehicle compartment only through the cooler core 52 as illustrated in FIG. 8B.

In the action mode of the refrigerant circuit 1U illustrated in FIG. 7D, the refrigerant-heat medium heat exchanger 11 functions as a condenser, and the refrigerant-heat medium heat exchanger 12 and the refrigerant-heat medium heat exchanger 13 function as evaporators. In this case, when the decompression is performed by the decompressor 14A and the decompressor 14B in two steps, the heat is absorbed in the refrigerant-heat medium heat exchanger 12 and the refrigerant-heat medium heat exchanger 13 step by step, as illustrated. Here, the decompressor 14B may be fully opened and the refrigerant-heat medium heat exchanger 11 may function as a condenser, the decompression may be performed by the decompressor 14A in one step, and the refrigerant-heat medium heat exchanger 12 and the refrigerant-heat medium heat exchanger 13 may function as evaporators. The action modes illustrated in FIGS. 7B and 7C are as described as above.

The series flow path 100T of the heat medium circuit 100 allows the heat medium to flow through the refrigerant-heat medium heat exchanger 11 functioning as a condenser, the heater core 51, and the outdoor heat exchanger 5 in this order. By this means, the heat medium heated by the heat released in the refrigerant-heat medium heat exchanger 11 functioning as a condenser passes through the flow path 101, is delivered to the heater core 51, and subjected to a heat exchange with the indoor air in the indoor air conditioner 50 for the heating operation. Then, the heat medium releases the heat in the outdoor heat exchanger 5, absorbs the heat in the refrigerant-heat medium heat exchanger 13, and is delivered to the cooler core 52. In the refrigerant circuit 1U, the heat is absorbed in the refrigerant-heat medium heat exchanger 12 and the refrigerant-heat medium heat exchanger 13 step by step. Here, the outdoor heat exchanger 5 is provided in the series flow path 100T on the inlet side of the refrigerant-heat medium heat exchanger 13, and the heat exchangers for temperature-adjustment subject parts 60, 63, 61, and 62 are provided in the series flow path 100T on the inlet side of the refrigerant-heat medium heat exchanger 12.

By this means, the heat of the heat medium having been subjected to a heat exchange with the outdoor air in the outdoor heat exchanger 5 can be absorbed into the refrigerant in the refrigerant-heat medium heat exchanger 13, and the heat of the heat medium having been subjected to heat exchanges with the temperature-adjustment subject parts in the heat exchangers for temperature-adjustment subject parts 60, 63, 61 and 62 can be absorbed into the refrigerant in the refrigerant-heat medium heat exchanger 12. In this way, the heat is generated by the operation of the refrigerant circuit 1U, and the heat medium to be delivered to the heater core 51 is heated in the refrigerant-heat medium heat exchanger 11. By this means, it is possible to perform the heating operation.

In this case, the heat medium having exited from the heat core 51 and been subjected to the heat exchange in the outdoor heat exchanger 5 flows into the refrigerant-heat medium heat exchanger 13 functioning as an evaporator. Therefore, the temperature of the heat medium exiting from the refrigerant-heat medium heat exchanger 13 can be relatively higher than that of the heat medium flowing through the circuit in which the heat medium does not flows in the order of the heater core 51, the outdoor heat exchanger 5, and the refrigerant-heat medium heat exchanger 13 as illustrated in FIG. 5. By this means, it is possible to prevent the temperature of the heat medium delivered to the cooler core 52 from decreasing too much, and therefore to prevent an effect on the comfort in the heating.

Meanwhile, the heat medium having been subjected to the heat exchanges in the heat exchangers for temperature-adjustment subject parts 60, 63, 61 and 62 flows into the refrigerant-heat medium heat exchanger 12. Therefore, the refrigerant-heat medium heat exchanger 12 can function as an evaporator, and consequently it is possible to switch the action mode of the refrigerant circuit to the action mode illustrated in FIG. 7C or 7D. In addition, by switching the action mode of the refrigerant circuit to the action mode illustrated in FIG. 7C or 7D, the amount of heat absorbed into the refrigerant in the refrigerant-heat medium heat exchanger 13 is smaller than in the action mode illustrated in FIG. 7B. By this means, it is possible to prevent the temperature of the heat medium delivered to the cooler core 52 from decreasing too much in the action mode illustrated in FIG. 7C or 7D, compared to the action mode illustrated in FIG. 7B. Consequently, it is possible to prevent an effect on the comfort in the heating.

Here, a blower fan (not illustrated) configured to send the outdoor air to the outdoor heat exchanger 5 is stopped, or a radiator shutter (not illustrated) is closed, and therefore it is possible to prevent the heat medium from being subjected to a heat exchange with the outdoor air in the outdoor heat exchanger 5. As a result, it is possible to send the warm heat medium having exited from the heater core 51 directly to the refrigerant-heat medium heat exchanger 13 functioning as an evaporator. By this means, it is also possible to prevent the temperature of the heat medium having exited from the refrigerant-heat medium heat exchanger 13 and being delivered to the cooler core 52 from decreasing too much. In this case, the blowing temperature of the heating operation can be higher than when the heat medium is subjected to a heat exchange with the outdoor air in the outdoor heat exchanger 5.

In this case, the air mix door 53 of the indoor air conditioner 50 is switched to allow all the flowing air to pass through the heater core 51 as illustrated in FIG. 8B. In addition, the auxiliary heat source 7 configured to be able to adjust the temperature is provided on the inlet side of the heater core 51 (for example, upstream of the pump P1), and by this means, it is possible to adjust the temperature of the heating.

In a case where a system malfunction occurs, and therefore the flow path switching device 100A becomes in the default state, when the refrigerant circuit 1U is not operated (for example, the compressor 10 has broken down), the heat medium is circulated through the series flow path 100T to realize appropriate action modes.

Abnormal action mode 3, which is one of the action modes in this case, allows to perform the heating operation and heat the battery, provided that the auxiliary heat source 7 configured to be able to adjust the temperature is provided in the series flow path 100T on the inlet side of the heater core 51 (for example, upstream of the pump P1).

Here, the heat medium circulating through the series flow path 100T releases the heat in the heater core 51 to have an temperature of 60 degrees Celsius which is the outlet temperature of the heater core 51; releases the heat in the outdoor heat exchanger 5 provided downstream of the heater core 51 to have an temperature of 50 degrees Celsius which is the outlet temperature of the outdoor heat exchanger 5; and releases the heat in the cooler core 52 provided downstream of the outdoor heat exchanger 5 to have a temperature of 40 degrees Celsius which is the outlet temperature of the cooler core 52. By this means, the temperature of the heat medium in the heat exchanger for temperature-adjustment subject part 60 for the battery provided downstream of the cooler core 52 can be reduced to the temperature range suitable to heat the battery while the heating operation is performed by the heater core 51.

In abnormal action mode 4, which is the other action mode in which the refrigerant circuit 1U is not operated, the temperature-adjustment subject parts (the battery, the power control unit, the inverter, and the motor) release the heat while the heat medium circulates through the series flow path 100T. In this case, the auxiliary heat source 7 is not used (stopped), and the heat of the temperature-adjustment subject parts is released in the outdoor heat exchanger 5 provided in the series flow path 100T. Here, it is possible to prevent the heat from being released into the compartment by stopping the indoor air conditioner 50 from sending the air.

The table illustrated in FIG. 9 lists the abnormal action modes and the operation modes of the heat medium temperature adjustment system 1. In the table, "a" indicates the default state of the selector valves V1 to V6, and "b" indicates the non-default state of the selector valves V1 to V6.

The abnormal action modes 1 to 4 in which all of the selector valves V1 to V6 of the flow path switching device 100A are in the default state in the heat medium circuit 100 are as described above. The heat medium temperature adjustment system 1 can perform operation modes 1 to 13 listed in the table by appropriately controlling the flow path switching device 100A and the refrigerant circuit controller 1A.

In the heat medium circuit 100 in the operation mode 1, the selector valve 3 is in the non-default state, and the other selector valves V1, V2, and V4 to V6 are in the default state to form an individual circuit including the pump P3, and an individual circuit including the pump P1 and the pump P2 connected in series.

In the refrigerant circuit 1U in the operation mode 1, the on-off valves 31V and 32V are closed, the amount of decompression of the decompressors 14A and 14B is appropriately adjusted, the decompressor 14A is approximately fully opened, and the decompressor 14B desirably reduces the pressure. In the refrigerant circuit 1U, the refrigerant-heat medium heat exchanger 11 and the refrigerant-heat medium heat exchanger 12 function as condensers (the heat release side), and the refrigerant-heat medium heat exchanger 13 functions as an evaporator (the heat absorption side).

In the operation mode 1, the refrigerant-heat medium heat exchanger 13 on the heat absorption side, the cooler core 52, and the heat exchanger for temperature-adjustment subject part 60 for the battery are provided in the individual circuit including the pump P3 in the heat medium circuit 100 to cool the vehicle compartment and cool the battery. Meanwhile, the refrigerant-heat medium heat exchangers 11 and 12 on the heat release side, the heater core 51, the tank 6, the outdoor heat exchanger 5, and the heat exchangers for temperature-adjustment subject parts 63, 61 and 62 are provided in the individual circuit including the pumps P1 and P2 in the heat medium circuit 100. Here, the heat released from the heat medium is distributed among the tank 6 to accumulate the heat, the outdoor heat exchanger 5 to release the heat to the outside, and the heat exchangers for temperature-adjustment subject parts 63, 61 and 62 to adjust the temperatures. By this means, the heat absorbed by intensively performing the cooling operation and cooling the battery is distributed and released in various locations. Consequently, it is possible to efficiently use the heat.

In the heat medium circuit 100 in the operation mode 2, the selector valves V3 and V4 are in the non-default state, and the other selector valves V1, V2, V5 and V6 are in the 25: default state to form an individual circuit including the pump P3, and an individual circuit including the pump P1 and the pump P2 connected in series. The refrigerant circuit 1U in the operation mode 2 is the same as that in the operation mode 1. A difference from the operation mode 1 is that the battery cooling is stopped, and the indoor air conditioner 50 performs the cooling operation.

In the heat medium circuit 100 in the operation mode 3, the selector valves V3 and V6 are in the non-default state, and the other selector valves V1, V2, V4 and V5 are in the default state to form an individual circuit including the pump P3, and an individual circuit including the pumps P1 and P2 connected in series. The refrigerant circuit 1U in the operation mode 3 is the same as that in the operation modes 1 and 2. In the operation mode 3, the cooling operation of the indoor air conditioner 50 in the operation mode 1 is stopped while the battery cooling is intensively performed, and only the refrigerant-heat medium heat exchanger 13 on the heat absorption side and the heat exchanger for temperature-adjustment subject part 60 for the battery are provided in an individual circuit including the pump P3.

In the heat medium circuit 100 in the operation mode 4, the selector valves V1 and V3 are in the non-default state, and the other selector valves V2, and V4 to V6 are in the default state to form an individual circuit including the pump P1, an individual circuit including the pump P2, and an individual circuit including the pump P3. The refrigerant circuit 1U in the operation mode 4 is the same as that in the operation modes 1 to 3, but the decompression is performed by the decompressor 14A and the decompressor 14B step by step.

In the heat medium circuit 100 in the operation mode 4, the refrigerant-heat medium heat exchanger 11 on the heat release side and the heater core 51 are provided in the individual circuit including the pump P1, the refrigerant-heat medium heat exchanger 12 on the heat release side, the tank 6, the outdoor heat exchanger 5, and the heat exchangers for temperature-adjustment subject parts 63, 61, and 62 are provided in the individual circuit including the pump P2, and the refrigerant-heat medium heat exchanger 13 on the heat absorption side, the cooler core 52, and the heat exchanger for temperature-adjustment subject part 60 for the battery are provided in the individual circuit including the pump P3.

The operation mode 4 is an operation mode to perform a dehumidifying and cooling operation (the temperature adjustment by heat release). In this mode, the battery is cooled while the cooling operation of the indoor air conditioner 50 is performed in the individual circuit on the heat absorption side in the same way as the operation mode 1, and the heater core 51 is provided in the individual circuit on the heat release side to perform the dehumidifying. In the operation mode 4, the cooling and dehumidifying is performed, and the battery is cooled on the heat absorption side, and meanwhile, on the heat release side, the air conditioning can be performed by using the heat medium having a high temperature flowing through the individual circuit including the pump P1 to achieve a target blowing temperature, and the temperatures can be adjusted in various locations by using the heat medium having a low temperature flowing through the individual circuit including the pump P2.

In the heat medium circuit 100 in the operation mode 5, the selector valves V1, V3 and V4 are in the non-default state, and the selector valves V2, V5 and V6 are default state to form an individual circuit including the pump P1, an individual circuit including P2, and an individual circuit P3. The refrigerant circuit 1U in the operation mode 5 is constituted by: a first route refrigerant circuit (to bypass the refrigerant-heat medium heat exchanger 12) in which the on-off valves 31V and 32V are opened, and the refrigerant from the compressor 10 passes through the refrigerant-heat medium heat exchanger 11, the bypass refrigerant flow path 31, and the refrigerant-heat medium heat exchanger 13, and returns to the compressor 10; and a second route refrigerant circuit (to bypass the refrigerant-heat medium heat exchanger 13) in which the refrigerant from the compressor 10 passes through the refrigerant-heat medium heat exchanger 11, the refrigerant-heat medium heat exchanger 12, and the bypass refrigerant flow path 32, and returns to the compressor 10.

In the refrigerant circuit 1U in the operation mode 5, the refrigerant-heat medium heat exchanger 11 functions as a condenser (the heat release side), the refrigerant-heat medium heat exchanger 12 functions as an evaporator (the heat absorption side) in the second route refrigerant circuit, and the refrigerant-heat medium heat exchanger 13 functions as an evaporator (the heat absorption side) in the first route refrigerant circuit.

In the heat medium circuit 100 in the operation mode 5, the refrigerant-heat medium heat exchanger 11 on the heat release side and the heater core 51 are provided in the individual circuit including the pump P1; the refrigerant-heat medium heat exchanger 12 on the heat absorption side, the tank 6, the outdoor heat exchanger 5, and the heat exchangers for temperature-adjustment subject parts 63, 61 and 62 are provided in the individual circuit including the pump P2; and the refrigerant-heat medium heat exchanger 13 on the heat absorption side, and the cooler core 52 are provided in the individual circuit including the pump P3.

The operation mode 5 is an operation mode to perform a heating and dehumidifying operation (the temperature adjustment by heat absorption). In this operation mode, the heat medium flowing through the refrigerant-heat medium heat exchanger 11 on the heat release side flows only to the heater core 51 to perform the heating operation, and the heat absorption side is separated into the individual circuit including the refrigerant-heat medium heat exchanger 12 and the individual circuit including the refrigerant-heat medium heat exchanger 13 to absorb the heat required for the heating operation from various locations. In addition, the cooler core 51 is independently provided in the individual circuit including the refrigerant-heat medium heat exchanger 13 to effectively dehumidify the vehicle compartment.

In the heat medium circuit 100 in the operation mode 6, the selector valves V1, V2, V5 and V6 are in the non-default state, and the other selector valves V3 and V4 are in the default state to form an individual circuit including the pump P1, an individual circuit including the pump P2, and an individual circuit including the pump P3. In the refrigerant circuit 1U in the operation mode 6, the on-off valves 31V and 32V are closed; the refrigerant-heat medium heat exchanger 11 and the refrigerant-heat medium heat exchanger 12 function as condensers (the heat release side); the refrigerant-heat medium heat exchanger 13 functions as an evaporator (the heat absorption side); and the amount of decompression of the decompressors 14A and 14B is adjusted to release the heat in the refrigerant-heat medium heat exchanger 11 and the refrigerant-heat medium heat exchanger 12 step by step, in the same way as the operation mode 4.

In the heat medium circuit 100 in the operation mode 6, the refrigerant-heat medium heat exchanger 11 on the heat release side, and the heater core 51 are provided in the individual circuit including the pump P1; the refrigerant-heat medium heat exchanger 12 on the heat release side, the tank 6, and the heat exchanger for temperature-adjustment subject part 60 are provided in the individual circuit including the pump P2; and the refrigerant-heat medium heat exchanger 13 on the heat absorption side, and the outdoor heat exchanger 5 are provided in the individual circuit including the pump P3.

The operation mode 6 is an operation mode to heat (warm up) the battery while performing the heating operation of the indoor air conditioner 50 by absorbing the heat from the outdoor air. In this mode, while the hot water having a high temperature flowing through the refrigerant-heat medium heat exchanger 11 on one of the heat release sides is flowed to the heater core 51 to perform the heating operation of the indoor air conditioner 50, the hot water having a relatively low temperature flowing through the refrigerant-heat medium heat exchanger 12 on the other heat release side is flowed to the heat exchanger for temperature-adjustment subject part 60 to heat the battery. By this means, it is possible to generate the heat mediums having different temperature ranges by the refrigerant circuit 1U, and therefore to efficiently perform the heating operation and heat the battery at desired temperatures.

In the heat medium circuit 100 in the operation mode 7, the selector valves V1, V2, and V6 are in the non-default state, and the other selector valves V3, V4, and V5 are in the default state to form an individual circuit including the pump P1, an individual circuit including the pump P2, and an individual circuit including the pump P3. In the refrigerant circuit 1U in the operation mode 7, the on-off valve 31V is opened, the on-off valve 32V is closed, and the decompressor 14A is closed to form a circuit (to bypass the refrigerant-heat medium heat exchanger 12) in which the refrigerant from compressor 10 passes through the refrigerant-heat medium heat exchanger 11, the bypass refrigerant flow path 31, and the refrigerant-heat medium heat exchanger 13, and returns to the compressor 10.

In the heat medium circuit 100 in the operation mode 7, the refrigerant-heat medium heat exchanger 11 on the heat release side, and the heater core 51 are provided in the individual circuit including the pump P1; the refrigerant-heat medium heat exchanger 12 without a heat exchange with the refrigerant, the tank 6, and the heat exchangers for temperature-adjustment subject parts 60, 61, 62, and 63 are provided in the individual circuit including the pump P2; and the refrigerant-heat medium heat exchanger 13 on the heat absorption side, and the outdoor heat exchanger 5 are provided in the individual circuit including the pump P3.

The operation mode 7 is an operation mode to accumulate and discharge the heat of the temperature-adjustment subject parts such as the battery while the heating operation of the indoor air conditioner 50 is performed by absorbing the heat from the outdoor air. While the heating operation of the indoor air conditioner 50 is performed by absorbing the heat from the outdoor air, a circuit that the heat medium flows through the heat exchangers for temperature-adjustment subject parts 60, 61, 62, and 63 is separated from the refrigerant circuit 1U, and the tank 6 for accumulating or discharging the heat is provided in the separated circuit. By this means, it is possible to efficiently accumulate and discharge the heat of the temperature-adjustment subject parts such as the battery.

In the heat medium circuit 100 in the operation mode 8, the selector valves V1, V2, and V6 are in the non-default state, and the other selector valves V3, V4, and V5 are in the default state to form an individual circuit including the pump P1, an individual circuit including the pump P2, and an individual circuit including the pump P3. In the refrigerant circuit 1U in the operation mode 8, the on-off valves 31V and 32V are opened, and the first route refrigerant circuit to bypass the refrigerant-heat medium heat exchanger 12, and the second route refrigerant circuit to bypass the refrigerant-heat medium heat exchanger 13 are formed, in the same way as the operation mode 5.

In the heat medium circuit 100 in the operation mode 8, the refrigerant-heat medium heat exchanger 11 on the heat release side, and the heater core 51 are provided in the individual circuit including the pump P1; the refrigerant-heat medium heat exchanger 12 on the heat absorption side, the tank 6, and the heat exchangers for temperature-adjustment subject parts 60, 61, 62, and 63 are provided in the individual circuit including the pump P2; and the refrigerant-heat medium heat exchanger 13 on the heat absorption side, and the outdoor heat exchanger 5 are provided in the individual circuit including the pump P3.

The operation mode 8 is an operation mode to use the heat accumulated in the temperature-adjustment subject parts such as the battery while performing the heating operation of the indoor air conditioner 50 by absorbing the heat from the outdoor air. Here, the second refrigerant-heat medium heat exchanger 12 on the heat absorption side absorbs the heat accumulated in the tank 6 and the temperature-adjustment subject parts such as the battery in the above-described operation mode 6, and therefore to obtain the heat required for the heating operation, together with absorbing the heat from the outdoor air.

In the heat medium circuit 100 in the operation mode 9, the selector valves V1 and V2 are in the non-default state, and the other selector valves V3 to V6 are in the default state to form an individual circuit including the pump P1, and an individual circuit including the pump P2. Here, the pump P3 is stopped. In the refrigerant circuit 1U in the operation mode 9, the on-off valve 31V is closed, the on-off valve 32V is opened, and the decompressor 14B is closed to form a refrigerant circuit to bypass the refrigerant-heat medium heat exchanger 13. In this case, the refrigerant-heat medium heat exchanger 13 is out of the refrigerant circuit 1U, and therefore the flow path 103 running through the refrigerant-heat medium heat exchanger 13 and the flow path to flow the heat medium to the heater core 52 are not used.

In the heat medium circuit 100 in the operation mode 9, the refrigerant-heat medium heat exchanger 11 on the heat release side, and the heater core 51 are provided in the individual circuit including the pump P1; and the refrigerant-heat medium heat exchanger 12 on the heat absorption side, the tank 6, and the heat exchangers for temperature-adjustment subject parts 60, 61, 62, and 63 are provided in the individual circuit including the pump P2.

The operation mode 9 is an operation mode to perform the heating operation of the indoor air conditioner 50 by using the accumulated heat. In this mode, the heat accumulated in the tank 6 and the temperature-adjustment subject part such as the battery in the operation mode 6 is absorbed in the individual circuit of the refrigerant circuit 1U including the refrigerant-heat medium heat exchanger 12 on the heat absorption side to perform the heating operation.

In the heat medium circuit 100 in the operation mode 10, the selector valves V1, V3, V5, and V6 are in the non-default state, and the other selector valves V2 and V4 are in the default state to form an individual circuit including the pump P1, an individual circuit including the pump P2, and an individual circuit including the pump P3. In the refrigerant circuit 1U in the operation mode 10, the on-off valves 31V and 32V are closed, the refrigerant-heat medium heat exchanger 11 and the refrigerant-heat medium heat exchanger 12 function as condensers (the heat release side), and the refrigerant-heat medium heat exchanger 13 functions as an evaporator (the heat absorption side), in the same way as the operation mode 4 and so forth.

In the heat medium circuit 100 in the operation mode 10, the refrigerant-heat medium heat exchanger 11 on the heat release side, and the heater core 51 are provided in the individual circuit including the pump P1; the refrigerant-heat medium heat exchanger 12 on the heat release side, the tank 6, and the outdoor heat exchanger 5 are provided in the individual circuit including the pump P2; and the refrigerant-heat medium heat exchanger 13 on the heat absorption side, and the heat exchanger for temperature-adjustment subject part 60 for the battery are provided in the individual circuit including the pump P3.

The operation mode 10 is an operation mode to perform a heating and defrosting operation by using the accumulated heat while the vehicle is stopped. Here, the heat accumulated in the battery is absorbed in the refrigerant-heat medium heat exchanger 13 to operate the refrigerant circuit 1U, and the heat medium heated by the heat released in the refrigerant-heat medium heat exchanger 12 and the heat accumulated in the tank 6 are flowed to the outdoor heat exchanger 5 to defrost the outdoor heat exchanger 5.

In the heat medium circuit 100 in the operation mode 11, the selector valves V1, V3, and V6 are in the non-default state, and the other selector valves V2, V4, and V5 are in the default state to form an individual circuit including the pump P1, an individual circuit including the pump P2, and an individual circuit including the pump P3. The operation mode 11 is an operation mode to perform the heating and defrosting operation by using the accumulated heat while the vehicle is moving, and is the same as the operation mode 10 except for the switching state of the selector valve V5. In the operation mode 11, the heat of the temperature-adjustment subject parts (the inverter, the motor, the power control unit and so forth) generated while the vehicle is driven, the heat released in the refrigerant-heat medium heat exchanger 12, and the heat accumulated in the tank 6 are used to defrost the outdoor heat exchanger 5.

In the heat medium circuit 100 in the operation mode 12, the selector valves V1, V2 and V5 are in the non-default state, and the other selector valves V3, V4, and V6 are in the default state to form an individual circuit including the pump P1, and an individual circuit including the pump 2, and the pump P3 is stopped.

The operation mode 12 is an operation mode to heat the battery while performing the heating operation of the indoor air conditioner 50 by absorbing the heat of the auxiliary heat source 7 to operate the refrigerant circuit 1U. The operation mode 12 is the same as the operation mode 9 except for the switching state of the selector valve V5.

In the operation mode 12, the heat added by the auxiliary heat source 7 is absorbed into the refrigerant in the refrigerant-heat medium heat exchanger 12, and the battery is heated in the heat exchanger for temperature-adjustment subject part 60 by the heat added by the auxiliary heat source 7 and the heat accumulated in the tank 6. In this case, the temperature of the heat medium used to heat the battery can be appropriately adjusted depending on the amount of heat generated by the auxiliary heat source 7, and therefore can be adjusted to a temperature range different from the temperature of the heat medium flowing through the individual circuit including the refrigerant-heat medium heat exchanger 11 on the heat release side. By this means, it is possible to heat the battery while performing the heating operation at an appropriate temperature.

In the heat medium circuit 100 in the operation mode 13, the selector valves V1, V2, and V4 are in the non-default state, and the other selector valves V3, V5, and V6 are in the default state to from an individual circuit including the pump P1, an individual circuit including the pump P2, and an individual circuit including the pump P3. The refrigerant circuit 1U in the operation mode 13 is the same as that in the operation mode 8. In this mode, the on-off valves 31V and 32V are opened, and the refrigerant circuit is constituted by the first route refrigerant circuit to bypass the refrigerant-heat medium heat exchanger 12 and the second route refrigerant circuit to bypass the refrigerant-heat medium heat exchanger 13.

In the heat medium circuit 100 in the operation mode 13, the refrigerant-heat medium heat exchanger 11 on the heat release side, and the heater core 51 are provided in the individual circuit including the pump P1; the refrigerant-heat medium heat exchanger 12 on the heat absorption side, the auxiliary heat source 7, the tank 6, and the heat exchangers for temperature-adjustment subject parts 60, 61, 62, and 63 are provided in the individual circuit including the pump P2; and the refrigerant-heat medium heat exchanger 13 on the heat absorption side, and the cooler core 52 are provided in the individual circuit including the pump P3.

The operation mode 13 is an operation mode to perform the heating operation of the indoor air conditioner 50 by the operation of the refrigerant circuit 1U to absorb the heat in the vehicle compartment and the heat discharged from and accumulated in the temperature-adjustment subject parts while adding the heat of the auxiliary heat source 7. In the operation mode 13, the heat of the vehicle compartment collected via the cooler core 52 is absorbed into the refrigerant in the refrigerant-heat medium heat exchanger 13 functioning as an evaporator of the first route refrigerant circuit, and the heat added by the auxiliary heat source 7, the heat accumulated in the tank 6, and the heat accumulated in and discharged from the temperature-adjustment subject parts such as the battery are absorbed into the refrigerant in the refrigerant-heat medium heat exchanger 12 functioning as an evaporator of the second route refrigerant circuit.

As described above, in the heat medium temperature adjustment system 1 according to the embodiment of the invention, the heat medium circuit 100 is configured to form the series flow path 100T when a system malfunction occurs to connect the pumps P1, P2, and P3 to the plurality of heat exchangers for temperature-adjustment subjects (the heater core 51, the cooler core 52, the outdoor heat exchanger 5, and the heat exchangers for temperature-adjustment subject parts 60, 61, 62, and 63). By this means, even during the system malfunction, it is possible to circulate the heat medium having the controlled temperature through the entire series flow path 100T of the heat medium circuit 100, and therefore to adjust the temperatures of a lot of temperature-adjustment subjects connected to the series flow path 100T.

Then, the series flow path 100T is formed in the default state when the flow path switching device 100A is not energized, and therefore, it is possible to automatically form the series flow path 100T when a system malfunction occurs and the flow path switching device 100A is not energized. Consequently, it is possible to establish a fail-safe system.

In addition, the plurality of individual circuits are formed in the heat medium circuit 100 by the flow path switching device 100A, and include the pumps (P1, P2, and P3), and the heat exchangers for temperature-adjustment subjects (the heater core 51, the cooler core 52, the outdoor heat exchanger 5, and heat exchangers for temperature-adjustment subject parts 60, 61, 62, and 63), respectively. By this means, it is possible to flow the heat mediums having different temperature ranges through the individual circuits, respectively, and to control the temperatures of the temperature-adjustment subjects in a plurality of temperature ranges.

Moreover, the heat medium temperature adjustment system 1 includes the refrigerant circuit 1U including the plurality of refrigerant-heat medium heat exchangers (11, 12 and 13) as the heat source, and at least one of the refrigerant-heat medium heat exchangers (11, 12 and 13) is provided in each of the above-described individual circuits. By this means, it is possible to appropriately set the temperature range of the heat medium flowing through the individual circuit by the heat absorbing function of each of the refrigerant-heat medium heat exchangers (11, 12, and 13).

In particular, two or more of at least three or more refrigerant-heat medium heat exchangers of the refrigerant circuit 1U are selected, and one of the selected refrigerant-heat medium heat exchangers functions as a condenser, and the other functions as an evaporator. By this means, it is possible to realize the above-described action modes of the refrigerant circuit 1U. By this means, by adding switching of the air flow path in the indoor air conditioner 50 to the series flow path 100T of the indoor air conditioner 50 including the heater core 51 and the cooler core 52, it is possible to switch between the heating operation and the cooling operation, even when a system malfunction occurs.

In this case, in the heat medium temperature adjustment system 1, the heat medium flows through the series flow path 100T in the order of the outdoor heat exchanger 5 configured to perform a heat exchange between the heat medium and the outdoor air, one of the refrigerant-heat medium heat exchangers as an evaporator, the cooler core 52 which is one of the heat exchangers for temperature-adjustment subjects, and the heat exchangers for temperature adjustment subject parts (60, 61, 62, and 63) which are other heat exchangers for temperature-adjustment subjects.

It is because the temperature required for the cooler core 52 is lower than the temperatures required for the heat exchangers for temperature-adjustment subject parts (60, 61, 62, and 63) during the cooling operation. Therefore, the heat medium is flowed in the order of the outdoor heat exchanger 5, the evaporator, the cooler core 52, and the heat exchangers for temperature-adjustment subject parts (60, 61, 62, and 63), and consequently it is possible to cool the heat medium in the evaporator after releasing the heat of the heat medium in the outdoor heat exchanger 5, even though the series flow path 100T is formed during the cooling operation. Accordingly, it is possible to cool the temperature-adjustment subjects while preventing an effect on the comfort during the cooling operation, and also possible to avoid a situation of stopping the vehicle from moving.

Moreover, in the heat medium temperature adjustment system 1, the heat medium is flowed through the series flow path 100T in the order of one of the refrigerant-heat medium heat exchangers as a condenser, the heater core 51 which is one of the heat exchangers for temperature-adjustment subjects, and the outdoor heat exchanger 5. By this means, by flowing the heat medium in the order of the condenser, the heater core 51, and the outdoor heat exchanger 5, it is possible to release the heat in the heater core 51 during the heating operation, and to release the heat in the outdoor heat exchanger 5 while preventing a heat exchange in the heater core 51 by using the air mix door 53 during the cooling operation.

In this case, on the downstream side of the outdoor heat exchanger 5, the heat medium flows through the outdoor heat exchanger 5, the evaporator, the cooler core 52, and the heat exchangers for temperature-adjustment subject parts (60, 61, 62, and 63) in this order as described above. By this means, during the cooling operation, the heat medium having been subjected to a heat exchange in the condenser flows to the evaporator after releasing the heat in the outdoor heat exchanger 5, and therefore does not flows directly to the evaporator. Consequently, it is possible to prevent an effect during the air conditioning. Also, the heat medium having been heated by the condenser does not flow directly to the heat exchangers for temperature-adjustment subject parts (60, 61, 62, and 63) provided downstream of the outdoor heat exchanger 5. By this means, it is possible to prevent the heat medium in a high temperature range used in the heater core 52 from flowing to the heat exchangers for temperature-adjustment subject parts (60, 61, 62, and 63), and therefore to prevent the temperatures of the temperature-adjustment subject parts from becoming too high.

Moreover, during the heating operation, it is possible to flow the heat medium having exited from the heater core 52 to the outdoor heat exchanger 5 and the evaporator in this order. By this means, the heat of the heat medium having exited from the heater core 52 can be used for defrosting of the outdoor heat exchanger 5, or used as a heat source of the evaporator.

Then, in the heat medium temperature adjustment system 1, the series flow path 100T includes the auxiliary heat source 7 configured to heat the heat medium and provided on the inlet side of the heater core 52 as needed. The auxiliary heat source 7 can be used as a heat source for the temperature adjustment during the heating operation in an abnormal situation, or as a heat source to perform the heating operation and heat the battery when the refrigerant circuit 1U is not operated. In addition, the auxiliary heat source 7 can be used to add the heat when the heat of the heat medium having exited from the heater core 52 is used for defrosting or used as the heat source of the evaporator as described above.

As described above, the embodiments of the present invention have been described in detail with reference to the drawings. However, the specific configuration is not limited to these embodiments, and the design can be changed without departing from the scope of the present invention. In addition, the above-described embodiments can be combined by utilizing each other's technology as long as there is no particular contradiction or problem in the purpose and configuration.

REFERENCE SIGNS LIST

1: heat medium temperature adjustment system,
1U: refrigerant circuit, 1A: refrigerant circuit controller,
31, 32: bypass refrigerant flow path,
5: outdoor heat exchanger, 6: tank,
7: auxiliary heat source, 10: compressor,
11, 12, 13: refrigerant-heat medium heat exchanger,
14A, 14B: decompressor, 15: backflow preventer,
20, 21, 22, 23: refrigerant flow path,
31A, 32A: branching point, 31B, 32B: joining point,
31V, 32V: on-off valve, 50: indoor air conditioner,
51: heater core, 52: cooler core,
60, 61, 62, 63: heat exchanger for temperature-adjustment subject part,
100: heat medium circuit, 100A: flow path switching device,
100T: series flow path,
101, 102, 103, 110, 111, 112, 120, 121, 122, 123, 130, 131, 132, 133, 140, 141, 142, 150, 151, 160, 161: flow path,
150A, 160A, 161A: joining point,
200: controller,
V1, V2, V3, V4, V5, V6: selector valve,
U: unit, P1, P2, P3: pump

The invention claimed is:

1. A heat medium temperature adjustment system comprising:
a heat medium circuit configured to circulate heat medium having a temperature controlled by a heat exchange with a heat source,
the heat medium circuit including:
a pump configured to pump the heat medium; and
a plurality of heat exchangers for temperature-adjustment subjects configured to perform heat exchanges with temperature-adjustment subjects,
wherein the heat medium circuit is configured to form a series flow path to connect the pump to the plurality of heat exchangers for temperature-adjustment subjects when a system malfunction occurs, and
the series flow path is formed when a flow path switching device of the heat medium circuit is not energized.

2. The heat medium temperature adjustment system according to claim 1, wherein:
a plurality of individual circuits are formed in the heat medium circuit by the flow path switching device; and
the pump and the plurality of heat exchangers for temperature-adjustment subjects are provided in the individual circuits, respectively.

3. The heat medium temperature adjustment system according to claim 2, further comprising a refrigerant circuit including a plurality of refrigerant-heat medium heat exchangers,
wherein at least one of the refrigerant-heat medium heat exchangers is provided in each of the individual circuits.

4. The heat medium temperature adjustment system according to claim 3, wherein the heat medium is flowed through the series flow path in an order of an outdoor heat exchanger configured to perform a heat exchange between the heat medium and outdoor air, one of the refrigerant-heat medium heat exchangers as an evaporator, a cooler core of an indoor air conditioner which is one of the heat exchangers for temperature-adjustment subjects, and an additional heat exchanger for temperature-adjustment subject part.

5. The heat medium temperature adjustment system according to claim 4, wherein the heat medium is flowed through the series flow path in an order of one of the refrigerant-heat medium heat exchangers as a condenser, a heater core of the indoor air conditioner which is one of the heat exchangers for temperature-adjustment subjects, and the outdoor heat exchanger.

6. The heat medium temperature adjustment system according to claim 5, wherein the series flow path includes an auxiliary heat source provided on an inlet side of the heater core and configured to heat the heat medium.

7. The heat medium temperature adjustment system according to claim 3, wherein the refrigerant circuit comprises two or more of the refrigerant-heat medium heat exchangers, and one of the two or more of the refrigerant-heat medium heat exchangers is a condenser, and the other is an evaporator.

8. A heat medium temperature adjustment system comprising:
a heat medium circuit configured to circulate heat medium having a temperature controlled by a heat exchange with a heat source, and
a refrigerant circuit including a plurality of refrigerant-heat medium heat exchangers,
the heat medium circuit including:
a pump configured to pump the heat medium; and
a plurality of heat exchangers for temperature-adjustment subjects configured to perform heat exchanges with temperature-adjustment subjects,
wherein:
the heat medium circuit is configured to form a series flow path to connect the pump to the plurality of heat exchangers for temperature-adjustment subjects when a system malfunction occurs;
a plurality of individual circuits are formed in the heat medium circuit by the flow path switching device;
the pump and the plurality of heat exchangers for temperature-adjustment subjects are provided in the individual circuits, respectively;
at least one of the refrigerant-heat medium heat exchangers is provided in each of the individual circuits; and
the heat medium is flowed through the series flow path in an order of an outdoor heat exchanger configured to perform a heat exchange between the heat medium and outdoor air, one of the refrigerant-heat medium heat exchangers as an evaporator, a cooler core of an indoor air conditioner which is one of the heat exchangers for temperature-adjustment subjects, and an additional heat exchanger for temperature-adjustment subject part.

9. The heat medium temperature adjustment system according to claim 8, wherein the heat medium is flowed through the series flow path in an order of one of the refrigerant-heat medium heat exchangers as a condenser, a heater core of the indoor air conditioner which is one of the heat exchangers for temperature-adjustment subjects, and the outdoor heat exchanger.

10. The heat medium temperature adjustment system according to claim 9, wherein the series flow path includes an auxiliary heat source provided on an inlet side of the heater core and configured to heat the heat medium.

11. The heat medium temperature adjustment system according to claim 8, wherein the refrigerant circuit comprises two or more of the refrigerant-heat medium heat exchangers, and one of the two or more of the refrigerant-heat medium heat exchangers is a condenser, and the other is an evaporator.

\* \* \* \* \*